United States Patent [19]
Dwyer et al.

[11] Patent Number: 5,316,426
[45] Date of Patent: May 31, 1994

[54] LATERAL BALE PICK-UP ASSEMBLY HAVING A BALE TURNER MOUNTED THEREON

[76] Inventors: Paul Dwyer; Mark A. Dwyer, both of HC60, Box 63, Bartlett, Nebr. 68622

[21] Appl. No.: 962,399

[22] Filed: Oct. 16, 1992

[51] Int. Cl.⁵ .............................................. B60P 1/48
[52] U.S. Cl. ................................... 414/24.5; 414/502
[58] Field of Search .................. 414/24.5, 111, 501, 414/502, 911

[56] References Cited

U.S. PATENT DOCUMENTS

| | | | |
|---|---|---|---|
| 3,209,932 | 10/1965 | Schiltz | 214/505 |
| 3,298,550 | 1/1967 | Schiltz | 214/505 |
| 3,924,765 | 12/1975 | Hostetler | 414/24.5 |
| 3,942,666 | 3/1976 | Pfremmer | 414/24.5 X |
| 4,068,804 | 1/1978 | Butler et al. | 241/101.7 |
| 4,101,081 | 7/1978 | Ritter et al. | 241/101.7 |
| 4,187,990 | 2/1980 | Lundahl et al. | 241/30 |
| 4,329,102 | 5/1982 | Gray | 414/24.5 |
| 4,367,855 | 1/1983 | von der Heide | 241/283 |
| 4,376,607 | 3/1983 | Gibson | 414/24.6 |
| 4,549,840 | 10/1985 | Ansbjer | 414/24.5 |
| 4,630,986 | 12/1986 | Taylor | 414/24.5 X |
| 4,718,806 | 1/1988 | Chambers | 414/24.5 |
| 4,909,694 | 3/1990 | Peters et al. | 414/24.5 |
| 4,938,646 | 7/1990 | Elias et al. | 414/24.5 |
| 4,971,504 | 11/1990 | Klompien | 414/24.5 X |
| 5,062,757 | 11/1991 | Eichenauer | 414/24.5 |
| 5,090,630 | 2/1992 | Kopecky et al. | 241/279 |

FOREIGN PATENT DOCUMENTS

| | | | |
|---|---|---|---|
| 2036591 | 2/1971 | Fed. Rep. of Germany | 414/111 |
| 2620300 | 3/1989 | France | 414/24.5 |
| 2621214 | 4/1989 | France | 414/24.5 |
| 2195976 | 4/1988 | United Kingdom | 414/24.5 |
| 2218396 | 11/1989 | United Kingdom | 414/24.5 |

*Primary Examiner*—Michael S. Huppert
*Assistant Examiner*—James Keenan
*Attorney, Agent, or Firm*—Zarley, McKee, Thomte, Voorhees & Sease

[57] ABSTRACT

A lateral bale pick-up assembly comprising an elongated wheeled frame having a bale conveyor positioned thereon for receiving large round bales thereon and for conveying the same either rearwardly or forwardly. A bale pick-up cradle is mounted at one side of the wheeled frame and is pivotally movable from a substantially vertically extending position upwardly from one side of the wheeled frame to a position extending outwardly from the one side of the wheeled frame. The cradle includes spaced-apart inner and outer tines which are adapted to engage the underside of the bale and to lift the same upwardly onto the bale conveyor on the wheeled frame. The forward end of the inner tine has a rotatable member provided thereon which is adapted to engage the bale resting on the ground and to turn the same 90° so that the bale will be received between the inner and outer tines with the ends of the bale being arranged in a fore and aft position.

12 Claims, 5 Drawing Sheets

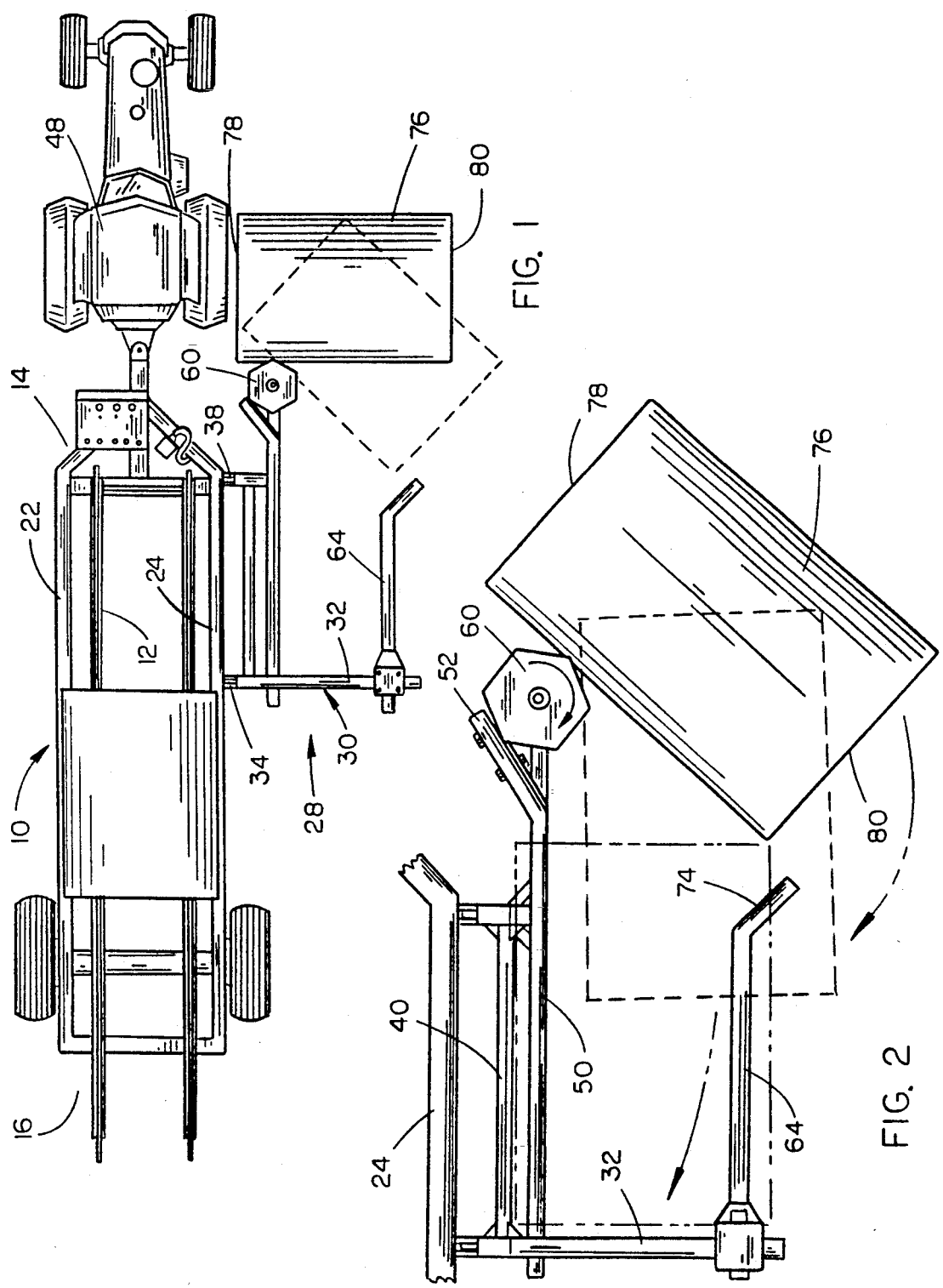

LATERAL BALE PICK-UP ASSEMBLY HAVING A BALE TURNER MOUNTED THEREON

BACKGROUND OF THE INVENTION

1. Field of the Invention

This invention relates to a hay bale pick-up assembly and more particularly to a hay bale pick-up assembly which is mounted at one side of a trailer or the like and which includes means for turning the bale 90°.

2. Description of the Prior Art

Hay balers are generally of two types. One type of hay baler is the type that forms rectangular bales. A second type of baler which has become extremely popular in recent years is the "round" baler which picks up hay from the ground and rolls the same into large cylindrical bales. The large cylindrical bales are dumped or ejected from the rearward end of the baler with the ends thereof being arranged transversely with respect to the longitudinal movement of the baler.

In many cases, a bale pick-up apparatus closely follows the hay baler and picks up the bales and places the same on an elongated wheeled frame means such as a trailer having a bale conveyor means mounted thereon. Inasmuch as the bales are approached by the bale pick-up assembly with the ends of the bales disposed transversely with respect to the direction of movement and inasmuch as the bales must be placed on the bale conveyor means with the ends thereof being arranged in a fore and aft condition, the bales must somehow be turned 90° prior to the bales being placed on the bale conveyor means on the wheeled frame means. Many elaborate devices have been previously provided but the same are extremely expensive to build and are difficult to use and to maintain.

SUMMARY OF THE INVENTION

A lateral bale pick-up assembly is disclosed herein which includes an elongated wheeled frame means which may be either of the trailer type or which may be mounted on the bed of a truck or the like. The wheeled frame means has an elongated bale conveyor provided thereon for receiving the round or cylindrical bales thereon with the ends thereof being arranged in a fore and aft position. The bale conveyor is designed to convey the bales either forwardly or rearwardly on the wheeled frame means.

The lateral bale pick-up assembly of this invention comprises a bale pick-up cradle which is mounted at one side of the wheeled frame means and which is pivotally mounted, about a horizontal axis parallel to the longitudinal axis of the wheeled frame means and the direction of travel of the wheeled frame means, from a substantially vertically extending position upwardly from the one side of the wheeled frame means to a position extending outwardly from the said one side of the wheeled frame means. The cradle assembly includes forwardly extending inner and outer tines which are adapted to engage the underside of the bale so that the cradle assembly may raise the same upwardly onto the bale conveyor on the wheeled frame means. The inner tine of the cradle assembly has a wheel positioned on the forward end thereof which is rotatably mounted thereto, about a vertical axis when the cradle assembly is in its outwardly extending position. The rotatable wheel is designed to engage the bale to turn the bale approximately 90° as the wheeled frame means moves forwardly with respect to the bale positioned on the ground so that the bale is received between the inner and outer tines with the ends thereof being positioned in a fore and aft position. The cradle assembly then lifts the bale upwardly onto the bale conveyor.

It is therefore the principal object of the invention to provide an improved lateral bale pick-up assembly.

A further object of the invention is to provide a lateral bale pick-up assembly which is designed to turn bales positioned on the ground approximately 90° to facilitate the bales being received in a cradle assembly in a fore and aft position.

Yet another object of the invention is to provide a lateral bale pick-up assembly which is economical to fabricate.

Yet another object of the invention is to provide a lateral bale pick-up assembly which is durable in use and refined in appearance.

These and other objects of the present invention will be apparent to those skilled in the art.

BRIEF DESCRIPTION OF THE DRAWINGS

FIG. 1 is a top view of the lateral bale pick-up assembly of this invention;

FIG. 2 is a partial top view of the invention illustrating the matter in which a cylindrical bale is turned;

DESCRIPTION OF THE PREFERRED EMBODIMENT

Figure 3:
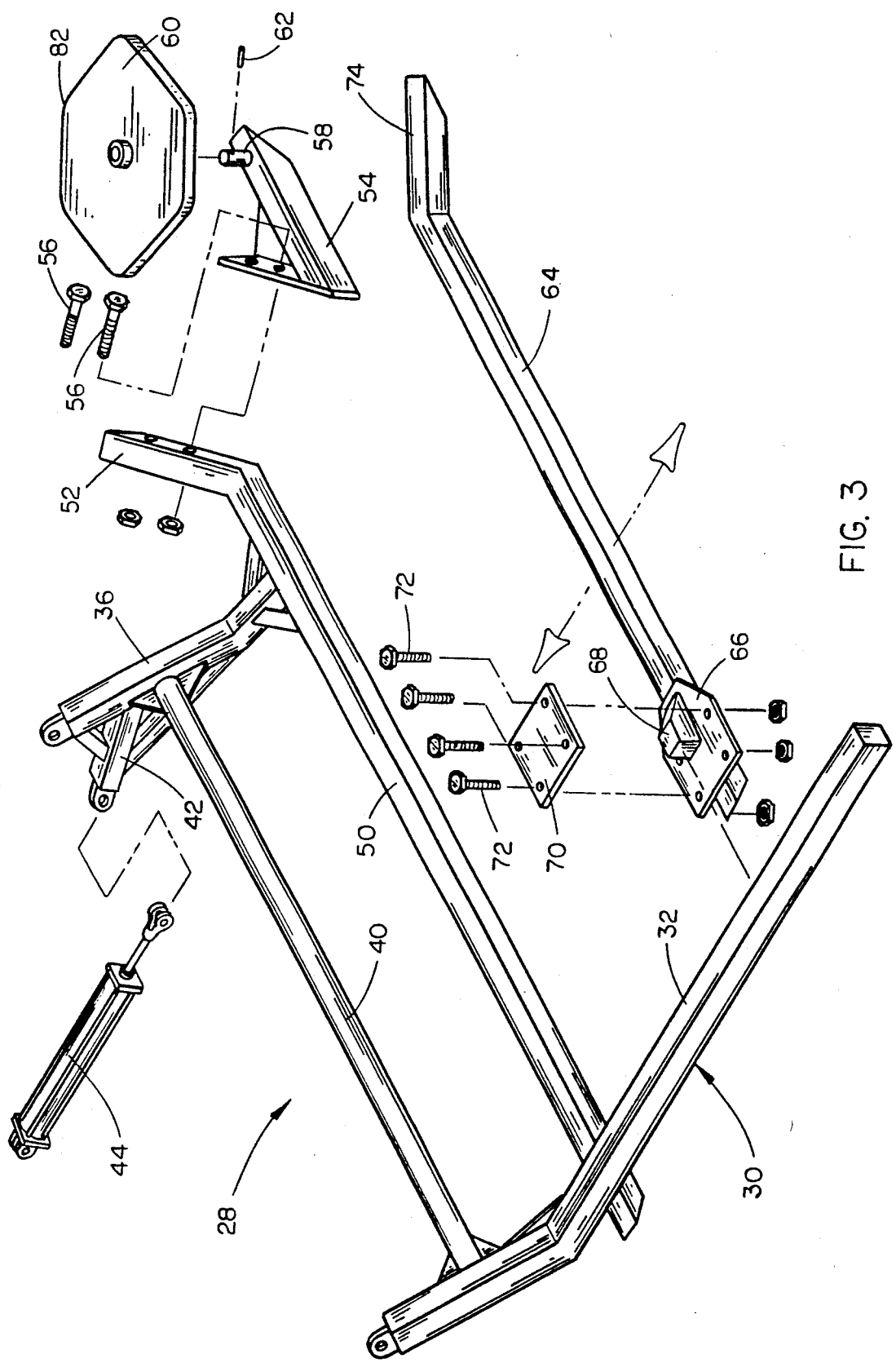
FIG. 3 is a partial rear exploded perspective view of the invention.
Figure 4:
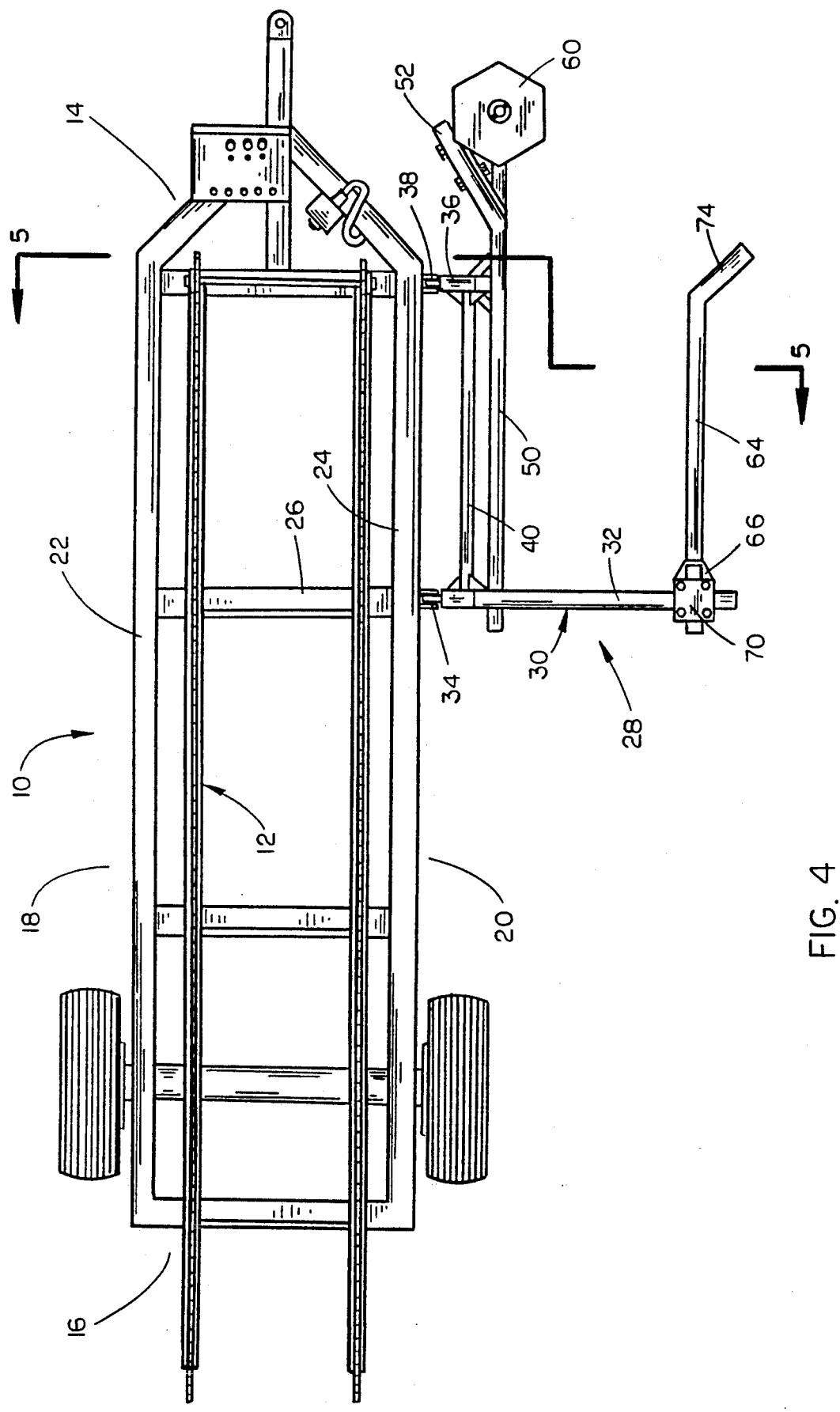
FIG. 4 is a top view of the invention.

The numeral 10 refers generally to a conventional bale carrier including a bale conveyor means 12 mounted thereon which is designed to convey the bales on the threader either forwardly or rearwardly. While the drawings illustrate the bale carrier as being a trailer, it should be understood that the bale carrier could also be mounted on a truck bed or the like. Although it is preferred that the bale carrier 10 have the bale conveyor means 12 thereon, there may be certain situations wherein a bale conveyor is not required although it is preferred.

For purposes of description, bale carrier 10 will be described as having a forward end 14, rearward end 16 and opposite sides 18 and 20 Bale carrier 10 includes a pair of elongated frame members 22 and 24 having cross braces 26 extending therebetween.

The lateral bale pick-up assembly of this invention is referred to generally by the reference numeral 28 and is pivotally mounted at one side of the bale carrier 10. Assembly 28 generally comprises a bale cradle 30 including a rear frame member 32 which is pivotally connected to frame member 24 at 34 and a front frame member 36 which is pivotally connected to frame member 24 at 38. As seen in FIG. 3, frame members 32 and 36 extend downwardly and outwardly from frame member 24 when the cradle 30 is positioned in its outwardly extending bale receiving position.

Brace 40 is secured to and extends between the frame members 32 and 36 as best seen in FIG. 3. Frame member 42 is secured to frame member 36 by welding or the like and extends inwardly therefrom for connection to hydraulic cylinder 44 which is pivotally connected to the forward most cross brace 26 at 46. Hydraulic cylinder 44 is operatively connected to the hydraulic system of the tractor 48.

An inner tine 50 is welded to the outer end of frame member 36 and to frame member 32 adjacent the inner end thereof as best seen in FIG. 3. The forward end of inner tine 50 is provided with an inwardly extending portion 52 having bracket 54 secured thereto by means of bolts 56. Bracket 54 is provided with an upwardly extending shaft or axle 58 having wheel or plate 60 rotatably mounted thereon. Pin 62 is received by an opening in axle 58 to maintain the wheel 60 on axle 58.

Outer tine 64 is selectively adjustably secured at its rearward end to frame member 32 adjacent the outer end thereof so that outer tine 64 may be moved inwardly or outwardly on frame member 32 to compensate for various bale sizes. Tine 64 includes a plate 66 welded to the upper rearward surface thereof which has an abutment 68 extending upwardly therefrom which is adapted to engage the forward side of frame member 32 to aid in preventing tine 64 from twisting or turning relative to frame member 32. Plate 70 is positioned over the upper surface of frame member 32 and is secured to plate 66 by means of the bolts 72. As seen in FIG. 3, the forward end of outer tine 64 is provided with an outwardly extending portion 74.

Figure 5:
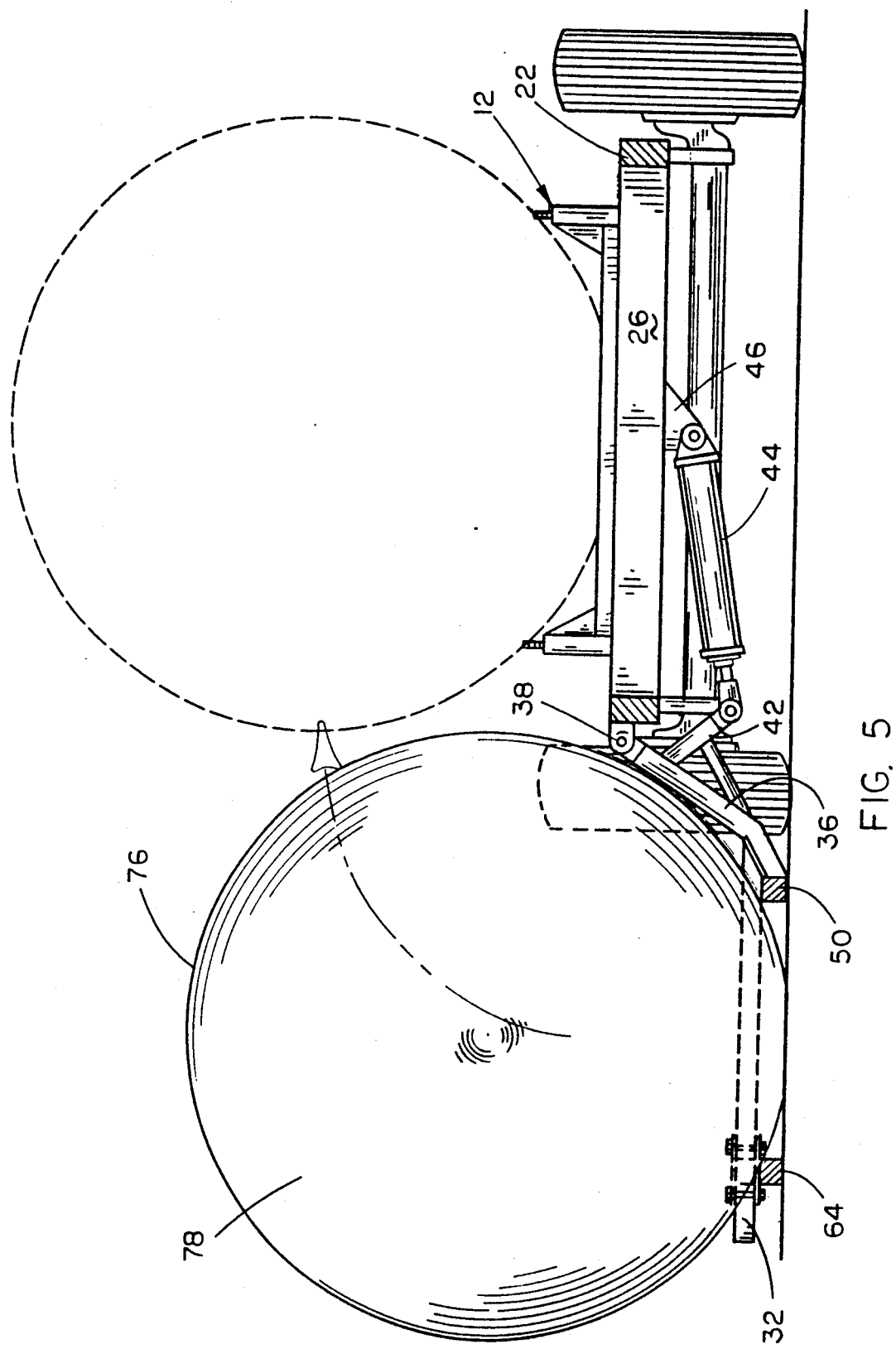
FIG. 5 is a front view of the invention as seen on lines 5—5 of FIG. 4 with the dotted lines indicating the position of the bale on the bale conveyor.
Figure 6:
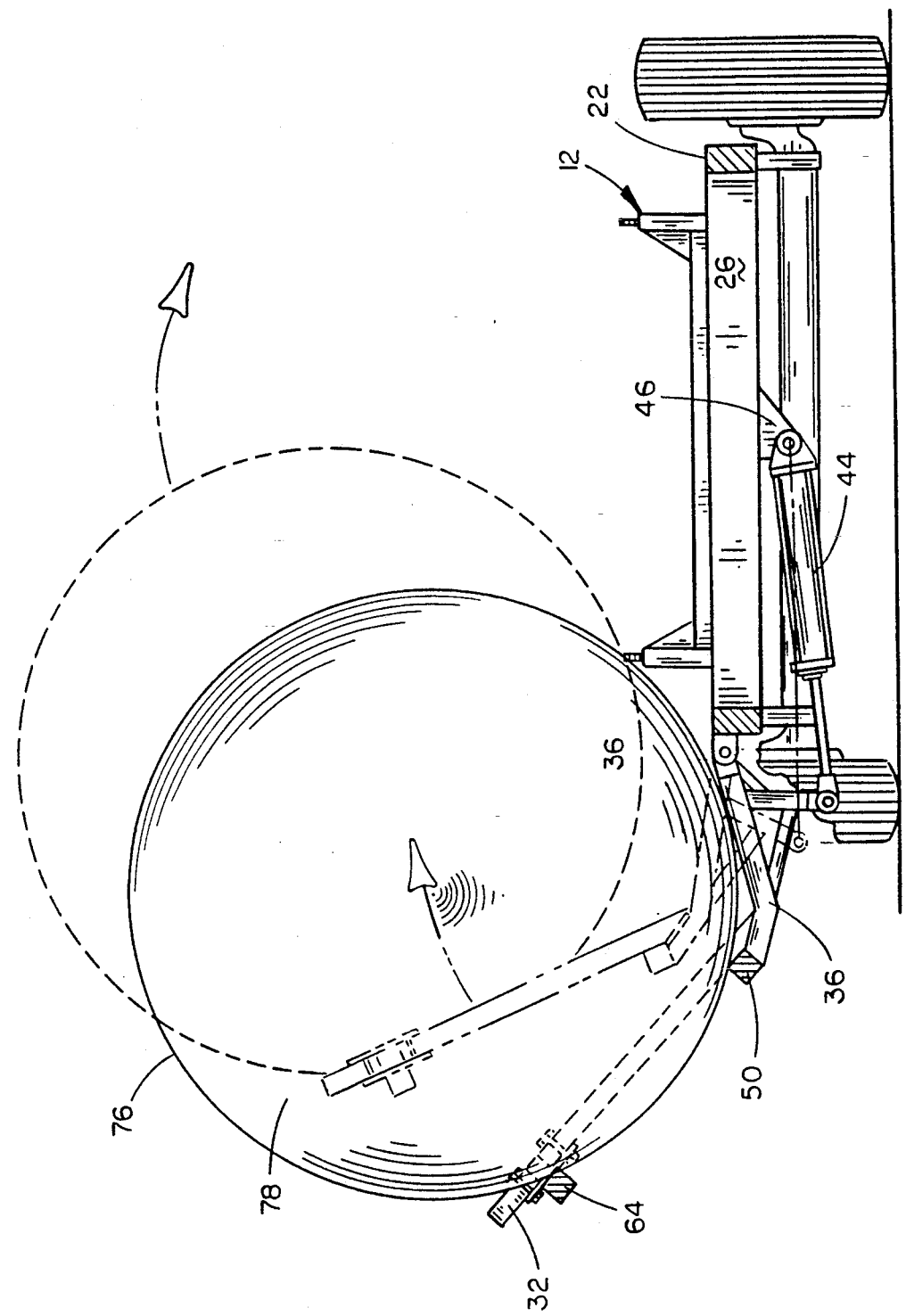
FIG. 6 is a view similar to FIG. 5 but which illustrates the bale having been lifted partially from the ground.

As previously stated, the cylindrical bales 76 are normally positioned on the ground with the ends 78 and 80 being disposed transversely with respect to the direction of travel of the bale carrier. Since the bale 76 must be somehow turned 90° so that it may be placed on the bale carrier 10 with the ends thereof being arranged in a fore to aft position, applicants have provided the bale turning wheel 60 on the forward end of inner tine 50. The wheel 60 may take many shapes but it is preferred that the wheel 60 have the hexagonal shape illustrated in FIG. 3 so that the apices 82 will dig or bite into the bale. In any event, as the bale carrier 10 approaches the bale 76 as illustrated in FIG. 1, the cradle 38 is in its outwardly extending position of FIG. 5. The tractor 48 is maneuvered relative to the bale 76 so that the wheel 60 will engage the lower portion of the bale 76 near one end of the bale as illustrated in FIG. 1. Continued forward movement of the tractor 48 relative to the bale 76 causes the bale to turn from the position of FIG. 1 to the position illustrated by dotted lines in FIG. 2. The periphery of the wheel 60 engages the underside of the bale and the bale 76 pivots or turns about wheel 60 as the tractor is moved forwardly so that the bale is turned 90°. The turned bale is received between the inner and outer tines 50 and 64. When the bale has been received between the tines 50 and 64, hydraulic cylinder 44 is actuated so that the cradle 30 is pivotally moved upwardly from the position of FIG. 5 to cause the bale 76 to be raised from the ground and dumped or deposited onto the bale conveyor 12. The bale conveyor 12 is then actuated or operated to move the bale rearwardly on the bale conveyor 12 to make room for another bale.

The cradle 30 is then again lowered to its outwardly extending position so that it may turn and load another bale.

Thus it can be seen that a novel bale turning assembly has been provided which enables the bale carrier to closely follow the hay baler and to travel in the same direction as the hay baler. The bale turner of this invention is quite simple but is extremely efficient. Thus it can be seen that the invention accomplishes at least all of its stated objectives.

We claim:

1. A lateral bale pick-up assembly comprising,
   an elongated wheeled frame means having rearward and forward ends and opposite sides,
   an elongated bale conveyor means on said wheeled frame means for receiving cylindrical bales thereon in a lengthwise position on said frame and for conveying the same both rearwardly and forwardly,
   means on the forward end of said wheeled frame means for attachment to a prime mover,
   a bale pick-up cradle assembly pivotally mounted at one side of said wheeled frame means,
   said cradle assembly being pivotally mounted, about a horizontal axis parallel to the longitudinal axis of said wheeled frame means and the direction of travel thereof, from a substantially vertical position extending upwardly from said one side of said wheeled frame means to a position extending outwardly from said one side of said wheeled frame means,
   said cradle assembly including spaced-apart forwardly extending inner and outer tines for picking up a bale on the ground alongside said one side of said wheeled frame means,
   and a generally disc shaped bale turning means at the forward end of one of said tines for engagement with a cylindrical bale positioned on the ground with the ends thereof arranged substantially transverse with respect to the movement of the wheeled frame means,
   said generally disc shaped bale turning means engaging the bale and turning the bale approximately 90° so that the ends thereof will be positioned in a lengthwise position on said frame when the bale is received between said inner and outer tines.

2. The assembly of claim 1 wherein said generally disc shaped bale turning means is rotatably mounted on the forward end of said one tine.

3. The assembly of claim 2 wherein said generally disc shaped bale turning means comprises a wheel means.

4. The assembly of claim 3 wherein the periphery of said wheel means is hexagonally shaped.

5. The assembly of claim 2 wherein said generally disc shaped bale turning means is rotatably mounted about a vertical axis, when said cradle assembly is in its outwardly extending position.

6. The assembly of claim 2 wherein said generally disc shaped bale turning means is mounted on the forward end of said inner tine.

7. A lateral bale pick-up assembly comprising,
   a frame means having rearward and forward ends and opposite sides,
   a bale pick-up cradle assembly pivotally mounted at one side of said wheeled frame means,
   said cradle assembly being pivotally mounted, about a horizontal axis parallel to the longitudinal axis of said wheeled frame means and the direction of travel thereof, from a substantially vertical position extending upwardly from said one side of said wheeled frame means to a position extending outwardly from said one side of said wheeled frame means,
   said cradle assembly including spaced-apart forwardly extending inner and outer tines for picking up a bale on the ground alongside said one side of said wheeled frame means, and a generally disc shaped bale turning means at the forward end of one of said tines for engagement with a cylindrical bale positioned on the ground with the ends thereof arranged substantially transverse with respect to the movement of the wheeled frame means, said generally disc shaped bale turning means engaging the bale and turning the bale approximately 90° so that the ends thereof will be positioned in a lengthwise position on said frame when the bale is received between said inner and outer tines.

8. The assembly of claim 7 wherein said generally disc shaped bale turning means is rotatably mounted on the forward end of said inner tine.

9. The assembly of claim 8 wherein said generally disc shaped bale turning means comprises a wheel means.

10. The assembly of claim 8 wherein the periphery of said wheel means is hexagonally shaped.

11. The assembly of claim 7 wherein said generally disc shaped turning means is rotatably mounted about a vertical axis, when said cradle assembly is in its outwardly extending position.

12. The assembly of claim 11 wherein said vertical axis is longitudinally aligned with said inner tine.

* * * * *